Jan. 6, 1953     G. A. LYON     2,624,632
WHEEL COVER
Filed Feb. 15, 1949
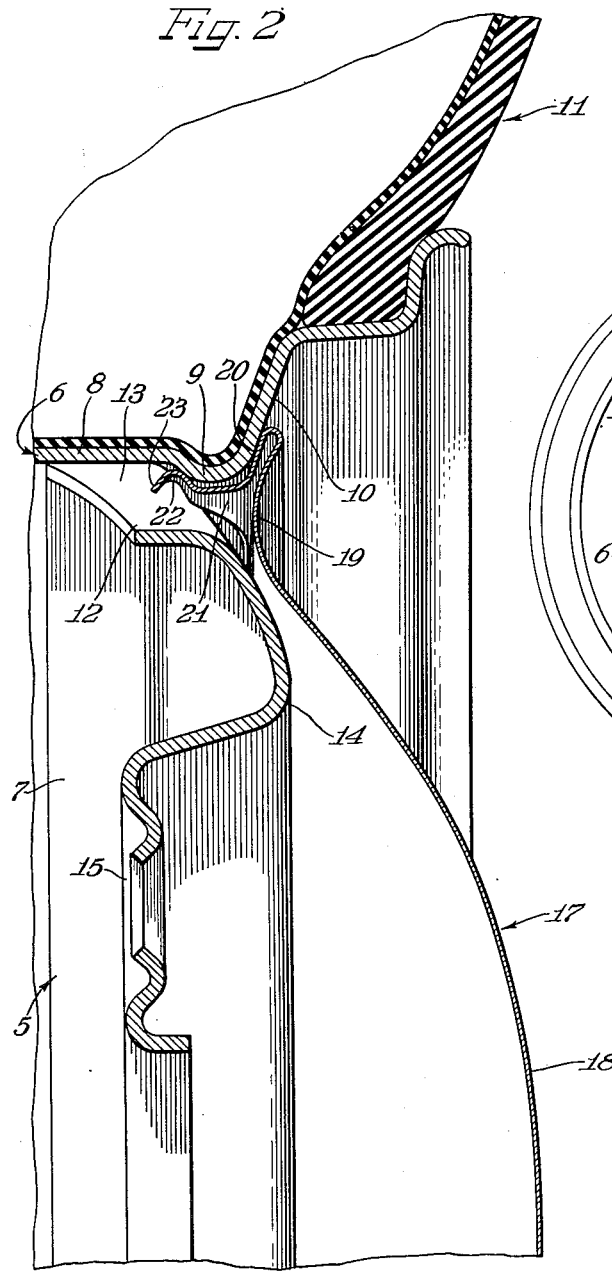
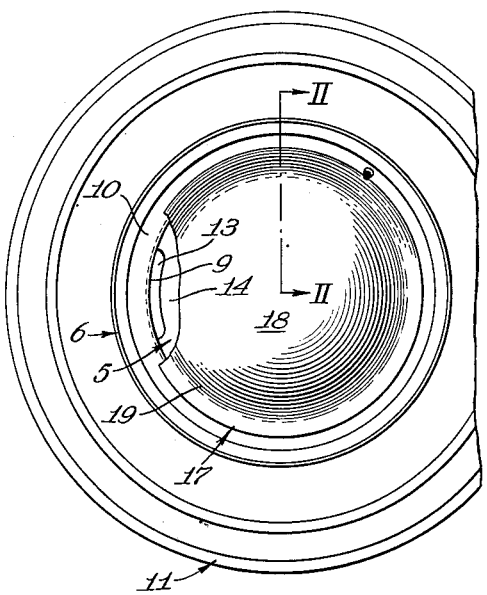
Inventor
George Albert Lyon Patented Jan. 6, 1953

2,624,632

UNITED STATES PATENT OFFICE 2,624,632

WHEEL COVER

George Albert Lyon, Detroit, Mich.

Application February 15, 1949, Serial No. 76,478

6 Claims. (Cl. 301—37)

1

The present invention relates to improvements in wheel structures and more particularly concerns protective and ornamental covering of the outer side of vehicle wheels.

An important object of the present invention is to provide an improved wheel structure wherein a vehicle wheel provided with wheel openings is substantially covered on the outer side thereof by means of a cover having novel retaining cooperation with the wheel within the wheel openings.

Another object of the invention is to provide an improved retaining structure for wheel covers disposed in covering relation at the outer side of vehicle wheels.

A further object of the invention is to provide economies in manufacture and simplifications in the mounting of vehicle wheel covers.

According to the general features of the present invention there is provided in a wheel structure including a wheel body and a tire rim, wherein the wheel body has openings at the juncture with the tire rim and the tire rim has cover retaining radially inwardly protruding means at the wheel openings, a cover member comprising a one piece sheet material disk having at the margin thereof a plurality of underturned and generally axially inwardly extending retaining spring fingers, said spring fingers being engageable in snap-on pry-off relation with said retaining protrusion and extending into the wheel openings, the margin of the cover axially outwardly from said fingers bearing against the side flange of the tire rim.

According to other general features of the invention, there is provided a wheel structure including a wheel body and a tire rim, the tire rim having a base flange and said base flange having at the axially outer margin thereof a radially inwardly projecting annular rib, a wheel body secured to said base flange at the axially inner side of the rib and having wheel openings at spaced intervals about its periphery, a cover for substantially concealing the inner portion of the tire rim and all of the wheel body, said cover member having axially inwardly extending spring retaining fingers engaging within said wheel openings behind said rib and having axially outer and radially outer means thereon engaging against the tire rim at the axially outer side of said rib whereby to retain the cover on the wheel.

Other objects, features and advantages of the present invention will be readily apparent from the following detailed description of a preferred embodiment thereof taken in conjunction with the accompanying drawings in which:

Figure 1 is a side elevational view of a wheel structure embodying features of the invention; and Figure 2 is an enlarged radial sectional view taken substantially on the line II—II of Figure 1.

2

As shown on the drawings:

A vehicle wheel as involved in the present invention comprises a wheel body 5 and a tire rim 6. Both the wheel body and the tire rim are preferably made from heavy gauge sheet metal, the wheel body being formed as a stamping and the tire rim formed as a stamping or as a rolled section. A peripheral flange 7 on the wheel body is secured in any appropriate fashion as by welding or riveting or the like to a base flange 8 of the tire rim. Attachment of the peripheral attachment flange 7 is effected at the axially inner side of a radially inwardly projecting annular rib 9 formed in the axially outer margin of the base flange 8 and merging at its axially outer side with a side flange 10 of the tire rim. The remainder of the tire rim is formed in the conventional manner to provide a drop center seat for a pneumatic tire and tube assembly 11.

The attachment flange 7 of the wheel body is indented at spaced intervals, as for example at four equally spaced intervals as indicated at 12 to provide a series of wheel openings 13 affording ventilation through the wheel. Radially inwardly from the wheel openings 13, the wheel body is formed with the usual reinforcing nose bulge 14 which defines a central generally dished bolt-on flange 15.

For protectively and ornamentally covering the outer side of the wheel and more especially the wheel body 5 and at least an adjacent portion of the tire rim 6, a cover 17 is provided. This cover comprises a central convex crown portion 18 of generally hub cap simulating shape and of a diameter to extend to adjacent the juncture of the wheel body and the tire rim at the radially outer side of the nose bulge 14 where the margin of the cover is formed with a concave cross-sectioned marginal portion 19 in general assemblance of the grooved formation between the wheel body and the tire rim and extending in concealing relation over the juncture of the wheel body and tire rim. At its radial extremity the cover member 17 is formed with an underturned flange 20 which affords a visible bead-like finished edge and also affords a strong marginal reinforcement for the cover.

In assembly of the wheel cover 17 with the wheel, the underturned flange 20 seats against the side flange 10 of the tire rim at the axially outer side of the rib 9.

For retaining the cover on the wheel, the underturned flange 20 is provided with a series of generally axially inwardly extending resilient retaining fingers 21 which are formed in one piece therewith and have generally radially outwardly and axially inwardly extending bowed radially outwardly projecting respective retaining terminals 22. The body portions of the spring retaining fingers 21 are radially inset sufficiently to clear the rib 9 while the retaining terminals of the fingers are spaced from the flange 20 slightly less than the width of the rib 9 so that when the cover 17 is disposed in fully assembled relationship with the flange 20 resting against the tire rim, the retaining spring terminal portions 22 of the fingers will engage retainingly behind the rib 9, that is at the axially inner side thereof.

In mounting the cover 17 upon the wheel, the retaining spring fingers 21, and more especially the retaining terminals 22 are located against the axially outer side of the retaining rib 9 with cam surfaces 23 of the retaining terminals engaging the generally rounded surface of the rib, and the cover is then manually pressed inwardly until the retaining terminals 22 of the spring fingers snap behind the retaining rib 9 and with the underturned flange 20 resting against the outer side of the tire rim. Thus, the wheel cover is self-retaining upon the wheel, and since the retaining fingers 21 engage within the wheel openings 13 the cover is not only held against axial displacement from the wheel, but also against rotary displacement on the wheel.

To remove the cover 17 from the wheel a pry-off tool such as a screw driver or the like is applied between the bead-like marginal reinforcing edge of the cover and the tire rim side flange 10 and the tool manipulated to force the retaining finger nearest the point of pry-off to spring out over the retaining rib 9.

I claim as my invention:

1. In a wheel structure including a wheel body and a tire rim, wherein the wheel body has openings at the juncture with the tire rim and the tire rim has cover retaining radially inwardly protruding means at the wheel openings, a cover member comprising a one-piece sheet material disk having at the margin thereof a plurality of underturned and generally axially inwardly extending retaining spring fingers, said spring fingers being engageable in snap-on pry-off relation with said protruding retaining means and extending into the wheel openings, the margin of the cover axially outwardly from said fingers bearing against the side flange of the tire rim.

2. In a wheel structure including a wheel body and a tire rim, the tire rim having a base flange and said base flange having at the axially outer margin thereof a radially inwardly projecting annular rib, the wheel body secured to said base flange at the axially inner side of the rib and having wheel openings at spaced intervals about its periphery, a cover for substantially concealing the inner portion of the tire rim and all of the wheel body, said cover member having axially inwardly extending spring retaining fingers engaging within said wheel openings behind said rib and having axially outer and radially outer means thereon engaging against the tire rim at the axially outer side of said rib whereby to retain the cover on the wheel.

3. A wheel cover comprising a convex crown portion, a shallow marginal portion of concave cross-section having an underturned flange formed in one piece with the crown portion and having formed in one piece therewith a plurality of axially inwardly extending retaining spring fingers each of which has an elongated resilient body portion and a terminal radially outwardly humped retaining portion adapted to engage behind a retaining rib on the base flange of a tire rim, said elongated body portion of each of the spring fingers being substantially longer than said humped retaining portion and being substantially flexible for snap-on, pry-off passage of said humped portions past said rib.

4. In a wheel structure including a tire rim and a wheel body, the wheel body having wheel openings at the tire rim, and the tire rim having a radially inwardly projecting annular rib at the axially outer sides of the wheel openings, a wheel cover for the outer side of the wheel comprising a one piece sheet construction including a central crown portion and a marginal formation including an underturned flange resting against the tire rim at the axially outer side of said rib and having a series of axially inwardly extending retaining fingers formed in one piece therewith and having retaining terminal portions projecting generally radially outwardly in spaced relation to said underturned flange slightly less than the width of the rib to engage retainingly against the axially inner side of the rib.

5. In a wheel structure, a tire rim having a base flange and a side flange angular thereto with a generally radially inwardly projecting annular rib at the juncture of the flanges, a wheel body having a marginal flange attached to said base flange axially inwardly from the rib, said marginal flange having a plurality of inset portions therein affording wheel openings between the base flange and said marginal flange, a cover substantially concealing the side flange of the tire rim and the wheel body and comprising a one-piece construction including a central crown portion and a concave marginal portion having an underturned marginal flange resting against said side flange and including a plurality of resilient retaining finger extensions extending generally axially inwardly past said rib and having generally radially outwardly humped retaining terminals thereon engaging behind said rib within said wheel openings, said retaining finger projections engaging said rib in snap-on pry-off relation.

6. In a wheel structure, a tire rim including a base flange, and a wheel body secured to said base flange inset from the axially outer margin of the base flange and the wheel body having the outer margin formed to provide a plurality of annularly spaced wheel openings, said outer margin of the tire rim base flange having a radially inwardly projecting annular rib which is thus disposed at the axially outer sides of the wheel openings, and a wheel cover having retaining elements including complementary portions engaging said rib and terminal portions extending into the wheel openings.

GEORGE ALBERT LYON.

REFERENCES CITED

The following references are of record in the file of this patent:

UNITED STATES PATENTS

| Number | Name | Date |
|---|---|---|
| Re. 20,258 | Horn | Jan. 26, 1937 |
| 1,944,658 | Griffith | Jan. 23, 1934 |
| 2,368,239 | Lyon | Jan. 30, 1945 |
| 2,522,271 | Horn | Sept. 12, 1950 |

FOREIGN PATENTS

| Number | Country | Date |
|---|---|---|
| 503,270 | Great Britain | Apr. 4, 1939 |